United States Patent [19]
Tomonaga et al.

[11] Patent Number: 5,480,722
[45] Date of Patent: Jan. 2, 1996

[54] ULTRAVIOLET RAY ABSORBENT GLASS AND METHOD FOR PREPARING THE SAME

[75] Inventors: Hiroyuki Tomonaga; Takeshi Morimoto; Kazuya Hiratsuka, all of Yokohama, Japan

[73] Assignee: Asahi Glass Company Ltd., Tokyo, Japan

[21] Appl. No.: 83,526

[22] Filed: Jun. 30, 1993

[30] Foreign Application Priority Data

Jul. 3, 1992 [JP] Japan .................................. 4-200683
Feb. 3, 1993 [JP] Japan .................................. 5-039432

[51] Int. Cl.⁶ .................................................. B32B 17/06
[52] U.S. Cl. ........................ 428/428; 428/201; 428/210; 428/333; 428/336; 428/432; 428/697; 428/699; 428/701; 428/702; 359/359; 359/361
[58] Field of Search ............................ 428/428, 432, 428/697, 699, 701, 702, 333, 336, 201, 210; 359/350, 359, 361

[56] References Cited

U.S. PATENT DOCUMENTS

| | | | |
|---|---|---|---|
| 4,377,613 | 3/1983 | Gordon | 428/333 |
| 4,461,532 | 7/1984 | Sato | 359/359 |
| 4,786,563 | 11/1988 | Gillery | 428/432 |
| 4,847,157 | 7/1989 | Goodman | 428/333 |
| 5,055,358 | 10/1991 | Livingstone | 428/432 |
| 5,073,451 | 12/1991 | Iida | 359/359 |
| 5,085,926 | 2/1992 | Iida | 428/432 |
| 5,130,183 | 7/1992 | Muromachi | 428/432 |
| 5,208,095 | 5/1993 | Nietering | 428/432 |
| 5,296,302 | 3/1994 | O'Shaughnessy | 428/432 |
| 5,316,854 | 5/1994 | Lin | 428/432 |
| 5,318,830 | 6/1994 | Takamatsu | 428/432 |

*Primary Examiner*—Ellis P. Robinson
*Assistant Examiner*—Timothy M. Speer
*Attorney, Agent, or Firm*—Oblon, Spivak, McClelland, Maier & Neustadt

[57] ABSTRACT

A ultraviolet ray absorbent glass comprises a substrate glass, a ultraviolet ray absorbent film including as the major component at least one selected from the group consisting of zinc oxide, titanium oxide and cerium oxide, and an intermediate film having an intermediate refractive index which is between the refractive indices of the ultraviolet absorbent film and the substrate glass, the intermediate film being located between the ultraviolet absorbent film and the substrate glass, whereby iridescence by the ultraviolet ray absorbent film is reduced, and a heat reflecting function is imparted.

9 Claims, 1 Drawing Sheet

ULTRAVIOLET RAY ABSORBENT GLASS AND METHOD FOR PREPARING THE SAME

BACKGROUND OF THE INVENTION

1. Field of the Invention

The present invention relates to a ultraviolet ray absorbent glass in which a ultraviolet ray absorbent film is formed on a glass surface.

2. Discussion of Background

It is important to interrupt ultraviolet rays entering into rooms or the cabin of automobiles from the viewpoint of not only preventing sunburn to human bodies but also preventing the deterioration of ornaments in the rooms or the cabin of automobiles.

Heretofore, there have been known to use organic compounds such as benzophenone, benzotriazole and so on as absorbing agents. However, such organic compounds have a disadvantage that they are easily deteriorated with the absorption of ultraviolet rays. In view of the disadvantage, several methods have been proposed wherein an inorganic compound such as zinc oxide, titanium oxide, cerium oxide or the like which does not cause deterioration and has a ultraviolet ray absorbing function is used and a film of the inorganic compound is formed on the surface of a substrate glass to thereby form a ultraviolet ray absorbent glass.

However, the above-mentioned method had a disadvantage as follows. When the oxide is used to form a film on an ordinary glass plate, iridescence was apt to occur in the reflection light due to interference of light because there was a large difference between the refractive indices of the substrate glass and the film of the oxide.

In particular, when a thin film (less than 100 nm) is formed on the substrate glass to impart a ultraviolet ray absorbing function, the ultraviolet absorptive power is insufficient although it can minimize the iridescence in the reflection light due to interference of light. On the other hand, a thick film (more than 800 nm) is formed, it has problems in the strength of the films, the transmittance of visible light and productivity although it can eliminate interference color. Accordingly, in many cases, films having a film thickness range which may cause interference color, are formed. Therefore, the problem of iridescence is unavoidable in a case that a ultraviolet ray absorbent glass is manufactured by using these oxides.

Further, in a summer season, heat of sunlight increases temperature in rooms to reduce cooling efficiency. In order to prevent the disadvantages, there has been an important problem to limit the entering of the sunlight into the rooms to improve the cooling efficiency by imparting heat ray reflectivity to glass plates for automobiles, buildings and so on.

Recently, heat ray reflecting glass which is obtained by forming on a glass surface a film formed of material such as a noble metal, a metallic oxide having electric conductivity or a nitride is mainly used. However, such film is insufficient to absorb ultraviolet rays. Further, it absorbs much visible light depending on material used. Accordingly, the heat ray reflecting glass can not be used as glass required to have a high visible light transmittance, for automobiles, buildings and so on.

Further, there has been proposed a technique of forming a transparent ornament on or in a glass plate by coating a material having a refractive index different from the above-mentioned glass plate, whereby a design is added to the glass plate (Japanese Unexamined Patent Publication No. 247539/1991).

Since metallic oxides such as zinc oxide, titanium oxide, cerium oxide or the like which is used for the film for absorbing ultraviolet rays have a higher refractive index than glass, they can be used for a film for forming the transparent ornament. However, the glass plate having the transparent ornament has a portion which does not partially interrupt ultraviolet rays.

SUMMARY OF THE INVENTION

It is an object of the present invention to provide a ultraviolet ray absorbent glass which reduces occurrence of iridescence in a ultraviolet ray absorbent film and has an excellent heat ray reflecting function.

The foregoing and other objects of the present invention have been attained by providing a ultraviolet ray absorbent glass which comprises a substrate glass, a ultraviolet ray absorbent film including as the major component at least one selected from the group consisting of zinc oxide, titanium oxide and cerium oxide, and an intermediate film having an intermediate refractive index which is between the refractive indices of the ultraviolet absorbent film and the substrate glass, said intermediate film being located between the ultraviolet absorbent film and the substrate glass, whereby iridescence by the ultraviolet ray absorbent film is reduced, and a heat reflecting function is imparted.

Further, in accordance with the present invention, there is provided a method of preparing a ultraviolet ray absorbent glass which comprises:

applying on a substrate glass a first solution including metallic compounds to form an intermediate film which has an intermediate refractive index which is between the refractive indices of a ultraviolet ray absorbent film and the substrate glass, and applying on the intermediate film a second solution including metallic compounds to form the ultraviolet ray absorbent film, whereby iridescence by the ultraviolet ray absorbent film is reduced, and a heat reflecting function is imparted.

As the ultraviolet ray absorbent film used for the present invention, a film comprising as the major component at least one selected from the group consisting of zinc oxide, titanium oxide and cerium oxide is used. Specifically, a film comprising $ZnO$, $TiO_2$, $CeO_2$, $ZnO$—$TiO_2$, $ZnO$—$CeO_2$, $TiO_2$—$CeO_2$ or $ZnO$—$TiO_2$—$CeO_2$ may be used. The composition may include another component.

Among the films as above-mentioned, the ultraviolet ray absorbent film of $CeO_2$—$TiO_2$ series is preferable since it has an excellent ultraviolet ray absorbing function, an excellent surface hardness and durability to chemicals. However, the film of the $CeO_2$—$TiO_2$ series has a very high refractive index, so that it may reduce the visible light transmittance due to a high reflectivity. Accordingly, it is preferable to add material such as $SiO_2$ or the like having a low refractive index so that the refractive index of the film produced is in a range about 1.9–2.1. The reduction of the visible light transmittance can be eliminated while maintaining a high ultraviolet ray absorbing function by reducing the refractive index of the ultraviolet ray absorbent film and by paying attention to the optical characteristic of an intermediate film which is formed below the ultraviolet ray absorbent film. As an example of the formulation (weight percentage) which has an effective ultraviolet ray absorbing function and a high durability while suppressing the refractivity, $CeO_2/TiO_2$ $SiO_2$=1.0–5.0/1.0/0.5–1.5 can be proposed.

The film thickness of the ultraviolet ray absorbent film of the present invention is in a range from 100 nm to 800 nm in consideration of the ultraviolet ray absorptive power, the transmittance of visible light, the film strength and so on.

It is important in the present invention that the intermediate film has an intermediate refractive index which is between the refractive indices of the ultraviolet ray absorbent film and the substrate glass.

From the viewpoints of reducing the iridescence suppressing, the reflection of visible light, and increasing the reflection in a near infrared ray region, the most preferable intermediate film is to have the refractive index which satisfies a non-reflection condition, i.e. the equation of $n_m=(n_f\times n_g)^{1/2}$ where $n_f$ is the refractive index of the ultraviolet ray absorbent film, $n_g$ is the refractive index of the substrate glass and $n_m$ is the refractive index of the intermediate film. In practical use, the intermediate film may have the refractive index in a range of $(n_f\times n_g)^{1/2}\pm 10\%$.

The film thickness of the intermediate film should have an optical film thickness $n_m d$ (d is the film thickness) of a $\lambda/4$ wavelength with respect to a visible light region (400 nm–700 nm), and the intermediate film should be a transparent film. Such intermediate film is effective to reduce iridescence and improve the heat interruption power. Especially, when the intermediate film have an optical film thickness of $\lambda/4$ of a high visual sensitivity region of 450 nm–650 nm, remarkable effects of reducing iridescence and improving heat interruption power can be obtained. In practical use, the intermediate layer may have an optical film thickness in a range of $\lambda/4\pm 10\%$.

In the intermediate film having the above-mentioned optical film thickness, the amplitude (intensity) of the reflection light (R1) reflecting at the interface between the ultraviolet ray absorbent film and the intermediate film is equal to the amplitude (intensity) of the reflection light (R2) reflecting at the interface between the intermediate film and the substrate glass, with respect to the visible light, and the phase of the two reflection light R1, R2 is inversed so that the two reflection light R1, R2 are attenuated by the synthesis. As a result, there is only a reflection light at the interface between air near the surface and the ultraviolet ray absorbent film, whereby iridescence of the reflection light due to interference of reflections at plural interfaces can be prevented.

The non-reflection condition is so designed as to obtain in the visible light region. In a near infrared region which has a wavelength longer than the visible light, the phase of the reflection light (R1, R2) is the same, whereby the reflection light is amplified by the synthesis, as a result of which the reflectivity in the region becomes high. Accordingly, the reflectivity of light in the near infrared ray region becomes relatively higher than that of the visible light region, and the heat interruption power also becomes high.

Material for forming the intermediate film of the present invention is not limited as far as the material satisfies the above-mentioned optical characteristic, for instance, $SiO_2$, $GeO_2$, $Al_2O_3$, $ZrO_2$, $TiO_2$, $SnO_2$, $In_2O_3$, $Ta_2O_5$, $ZnO$, $CeO_2$ or the like, or a mixture thereof, e.g. $ZrO_2$—$SiO_2$ or the like, and it can form a transparent film. Further, from the viewpoint of increasing a ultraviolet ray absorbing function, it is preferred to contain in the intermediate film an oxide for absorbing ultraviolet rays such as zinc oxide, titanium oxide, cerium oxide or the like.

Further, materials of two component series such as $ZnO$—$SiO_2$, $ZnO$—$Al_2O_3$, $ZnO$—$GeO_2$, $ZnO$—$ZrO_2$, $TiO_2$—$SiO_2$, $TiO_2$—$Al_2O_3$—$TiO_2$—$GeO_2$, $TiO_2$—$ZrO_2$, $CeO_2$—$SiO_2$, $CeO_2$—$Al_2O_3$, $CeO_2$—$GeO_2$, $CeO_2$—$ZrO_2$ or materials of a three or more component series wherein at least one component selected from the group consisting of $ZnO$, $TiO_2$ and $CeO_2$ is added to the two-component series material, may be used.

Further, the heat ray reflection power can be increased by incorporating an electric conductive component in the intermediate film. As the electric conductive component, $Sb$—$SnO_2$, $Sn$—$In_2O_3$ or $Al$—$ZnO$ is exemplified.

In the present invention, when the heat interruption power (the ratio of difference of the solar radiation transmittance and the visible light transmittance of glass) is 1 or higher, heat ray reflecting power is given.

In the present invention, methods of forming the ultraviolet absorbent film and the intermediate film are not particularly limited, but conventional methods which have been used for forming films, dry processes such as a vacuum deposition method, a sputtering method, a CVD method or a wet process such as a sol-gel method, a spray type thermal decomposition method or a coating type thermal decomposition method can be widely used.

In forming a transparent ornament in the glass plate, the patterning of the intermediate film is performed before the formation of the ultraviolet ray absorbent film. In the patterning method, a part of the intermediate film may be removed by etching or the like after the intermediate film has been formed in the glass surface, or a printing method or a masking method may be used to form a portion where a part of the intermediate film is previously omitted.

BRIEF DESCRIPTION OF DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
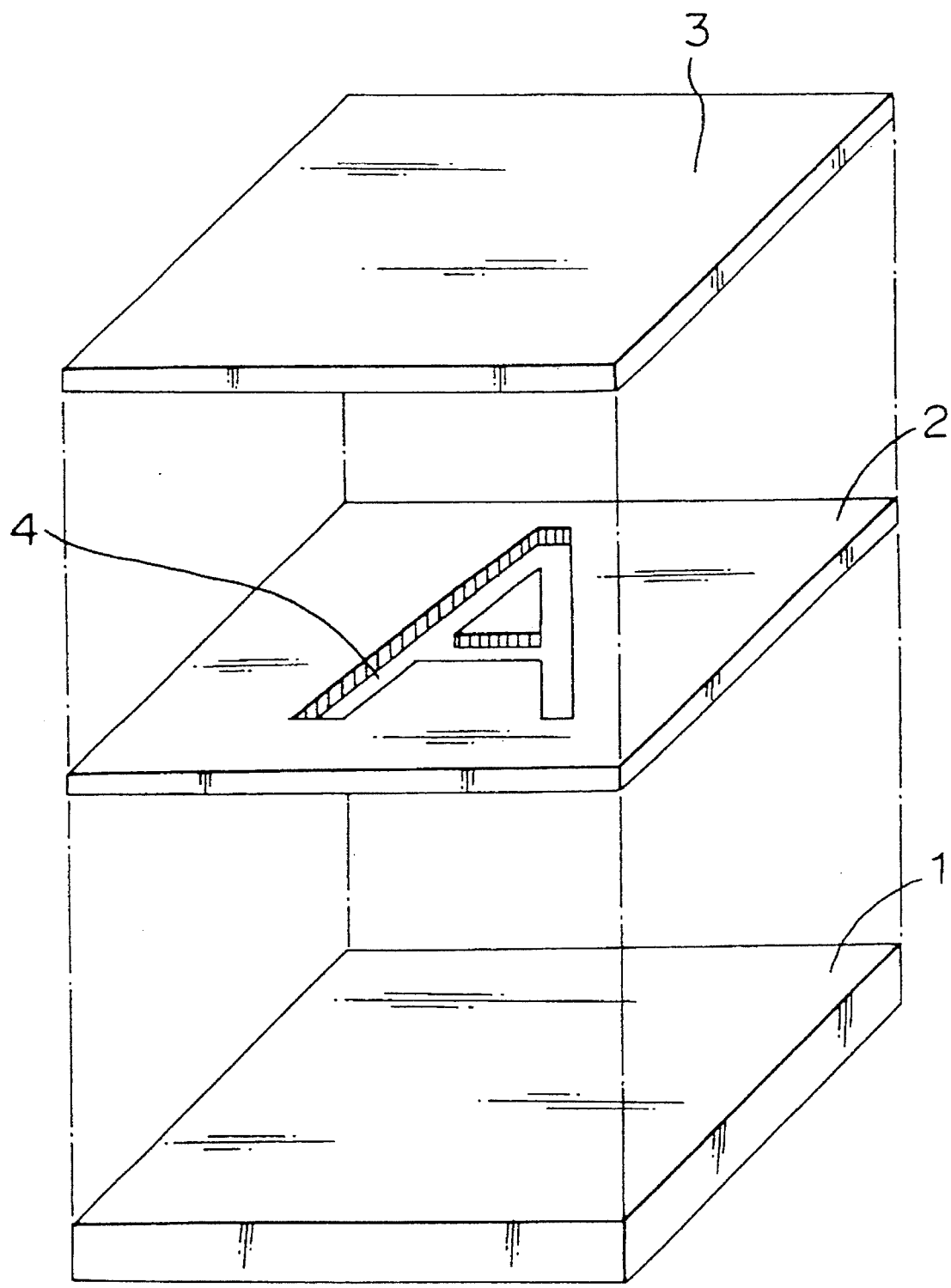
FIG. 1 is a schematic view showing a ultraviolet ray absorbent glass having an ornament.

A preferred embodiments of the present invention will be described with reference to the drawing.

In FIG. 1, reference numeral 1 designates a substrate glass, numeral 2 designates an intermediate film for preventing interference color, numeral 3 designates a ultraviolet ray absorbent film, and numeral 4 designates a hollowed portion in the intermediate layer for preventing interference color.

The intermediate film for preventing interference color which has a pattern is formed on the substrate glass by using a conventional method such as a sputtering method or a sol-gel method. Further, the ultraviolet ray absorbent film 3 comprising titanium oxide, cerium oxide and so on as major components is formed on the entire area of the intermediate film 2 by a conventional method so that the film 3 has a predetermined thickness. The interference color can be changed by changing the film thickness of the ultraviolet ray absorbent film. Accordingly, the color of an ornament can be changed depending on a position of a ultraviolet ray absorbent glass to be used and environments.

The ultraviolet ray absorbent glass of the present invention is preferably used for automobiles. In preparing it, a first solution including metallic compounds for forming the intermediate film is applied onto a substrate glass, and a second solution including metallic compounds for forming the ultraviolet ray absorbent film is applied onto the intermediate film.

The second solution applied on the substrate glass may be baked by utilizing heat used for strengthening glass and/or heat used in a shaping process, particularly for automobiles.

The solution applied on the substrate glass by a wet process becomes a strong film by reacting with glass by the application of heat. However, it is preferable that the ultraviolet ray absorbent glass of the present invention is baked by heat which is produced at the final process for strengthening and shaping a window glass for automobiles in which the window glass is heated at a temperature near the glass softening point.

Although it is possible to previously bake the glass before strengthening and shaping, it is advantageous in productivity and manufacturing cost to bake the glass by utilizing heat used for strengthening and/or shaping of the glass.

The solution for forming the intermediate film and the solution for forming the ultraviolet ray absorbent film are not particularly limited as far as they are soluble to solvent. However, metal alkoxide or a metal chelate compound is preferably used in consideration of uniformity in the film after the baking and the hardness of the film surface after the baking.

The solution including the metal alkoxide or the metal chelate may be formulated by a conventional method such as a sol-gel method. Tetraisopropyl titanate (TPT), tetraethylortho silicate (TEOS) and so on are dissolved in an organic solvent such as alcohol, in consideration of the refractive index of each of the oxides and the refractive index of a film obtained by a mixture while the formulation is controlled from Lorenz-Lorenz formula, and if necessary, an aqueous solution such as hydrochloric acid or nitric acid is added to progress hydrolysis and polymerization.

As the method of forming the film, a conventional method such as a wet type coating method can be used. However, a transfer-printing or flexographic printing is more preferably used in consideration of productivity, the yield of the solution for forming the film and uniformity in film thickness.

When the transfer-printing or flexographic printing method is selected, selection of solvent is an important factor from the viewpoint of the rheology characteristic of the solution to be applied. As organic solvent having a suitable rheology characteristic for the solution applied by printing, there are a glycol such as hexylene glycol, diethylene glycol or the like and a glycol ether such as diethylene glycol monoethyl ether or the like.

An upper coat may be applied after the intermediate film has been applied, followed by baking. However, this method uses baking processes twice, and it is disadvantage in saving energy. An advantageous way is that after the solution for the intermediate film has been applied, it is dried by hot air or the irradiation of ultraviolet rays; an upper coat is applied on the dried film, and the two layers are simultaneously baked.

The drying method by irradiating ultraviolet rays is very effective from the aspect of productivity since a drying time is short as several seconds to several tens seconds. When an organic metallic compound such as metal alkoxide or a metal chelate compound is used in that case, the effect obtained by irradiating ultraviolet rays is further increased since many of organic compounds have sensitivity to ultraviolet rays.

As conditions of treatment to dry the intermediate film, although they vary depending on the formulation of the solution and the film thickness, the intermediate film can be dried to an extent of capable of applying the upper coat by heating it at a temperature of 100° C.–150° C. for more than two minutes in a case of using a hot air drying method, or by irradiating ultraviolet rays in an energy level more than about 3 J/cm$^2$ in a case of irradiating ultraviolet rays. By combining these measures, it is possible to dry the intermediate film with a further shorter time and a lower energy.

Further, a ceramic color paste or an electric conductive silver paste used for a window glass for automobiles can be simultaneously baked when they are in a complex form. In this case, the ceramic color paste or the conductive silver paste may be printed before the baking of the ultraviolet ray absorbent film applied to the glass in a furnace for strengthening. On the contrary, the ultraviolet ray absorbent film may be formed by printing on the substrate glass which has been applied with the ceramic color paste or the conductive silver paste followed by dried, and then, the baking process be conducted. Of course, the ultraviolet ray absorbent film, the ceramic color paste or the conductive silver paste can be separately baked. However, this method is disadvantageous in saving energy as described before.

Several Examples will be described. However, the present invention is not limited to these examples.

Evaluation of films obtained by the following Examples and Comparative Examples was made with respect to appearance (by eyes), ultraviolet ray transmittance ($T_{UV}$: ISO9050), visible light transmittance ($T_V$: JIS-R3106), solar radiation transmittance ($T_E$: JIS-R3106), heat interruption power (ratio of difference between the solar radiation transmittance and the visible light transmittance to glass, $\Delta T_E/\Delta T_V$) and chroma ($C^*$ : $(a^{*2}+ b^{*2})^{1/2}$ in CIEL*a*b*).

EXAMPLE 1

22 g of 1-propanol, 7 g of acetylacetone and 30 g of cerium nitrate were mixed and dissolved to form a solution (A solution), and the solution was stirred for a night.

To 58 g of 2-propanol, 26 g of the solution A, 3.6 g of ethyl silicate 40 (silica content: 40%), 8.7 g of titaneacetylacetonate (Ti(OPr)$_2$(Acac)$_2$) and 0.6 g of a 0.1N hydrochloric acid aqueous solution were mixed to prepare a coating solution B.

To ethanol, 4.5 g of ethyl silicate 40, 4.3 g of tetraisopropyl titianate and 3.0 g of 0.1N hydrochloric acid aqueous solution were successively added and well mixed to prepare a coating solution C.

On soda lime glass ($n_g$=1.52), the coating solution C was applied by a spin coat method. The coating solution C was baked at 200° C. for 30 minutes to obtain an intermediate film of a TiO$_2$—SiO$_2$ series transparent film (TiO$_2$:SiO$_2$= 40/60) in weight ratio) which had a refractive index of 1.74 and a film thickness of 68 nm. The coating solution B was applied thereon by spin-coating method, and was baked at 600° C. for 5 minutes to form a CeO$_2$—TiO$_2$—SiO$_2$ series ultraviolet ray absorbent film (CeO$_2$:TiO$_2$:SiO$_2$=64/18/18 in weight ratio). The ultraviolet ray absorbent film had a refractive index of 2.05 and a film thickness of 180 nm. The optical characteristics measured are shown in Table 1.

EXAMPLE 2

In ethanol, ethyl silicate 40, tetraisopropyl titanate and a 0.2N-hydrochloric acid aqueous solution were successively added and well mixed to prepare a coating solution for forming an intermediate film. The coating solution was coated on the soda lime glass by a spin coat method. The coated solution was baked at 200° C. for 30 minutes to obtain an intermediate film (TiO$_2$:SiO$_2$ =38/62 in weight ratio) composed of a TiO$_2$—SiO$_2$ series transparent film having a refractive index of 1.72 and a film thickness of 75 nm.

On the intermediate film, cerium oxide colloidal sol (manufactured by Taki Kagaku K.K.: tradename: Needral U-15) was coated by the spin coat method. The cerium oxide colloidal sol was baked at 200° C. for 30 minutes to form a ultraviolet ray absorbent film, whereby a ultraviolet ray absorbent glass was obtained. The ultraviolet ray absorbent film had a refractive index of 1.95 and a film thickness of 290 nm. The characteristics of the obtained ultraviolet ray absorbent glass are shown in Table 1.

EXAMPLE 3

Ethyl silicate, cerium nitrate and acetylacetone were successively added to ethanol to prepare a coating solution for an intermediate film. The coating solution was coated on soda lime glass by a spin coat method. The coated solution was baked at 400° C. for 10 minutes to obtain an intermediate film ($CeO_2$:$SiO_2$=40/60 in weight ratio) composed of a transparent film of $CeO_2$—$SiO_2$ having a refractive index of 1.68 and a film thickness of 68 nm. On the intermediate film, a coating solution in which fine particles of zinc oxide are dispersed (manufactured by Sumitomo Cement Kabushiki Kaisha, tradename: ZC-120M) was coated by the spin coat method. The coated solution was subjected to the same treatment as in Example 1 to form a ultraviolet ray absorbent film whereby a ultraviolet ray absorbent glass was obtained. The obtained zinc oxide film had a refractive index of 1.88 and a film thickness of 520 nm. The characteristics of the obtained ultraviolet ray absorbent glass is shown in Table 1.

EXAMPLE 4

A ultraviolet ray absorbent glass was prepared in the same manner as in Example 1 except that the intermediate film had a refractive index of 1.73 and a film thickness of 70 nm, which was formed by using a coating solution in which fine particles of antimony-containing tin oxide having an average diameter of 10 nm are dispersed so as to have a weight ratio of $SiO_2$/$TiO_2$/Sb—$SnO_2$=30/10/60. The characteristics of the glass obtained are shown in Table 1.

COMPARATIVE EXAMPLE 1

A ultraviolet ray absorbent glass was prepared in the same manner as Example 1 except that the intermediate film was not formed. The characteristics of the glass obtained are shown in Table 1.

TABLE 1

| | Upper coat film thickness (nm) | $T_{UV}$ (%) | $T_V$ (%) | $T_E$ (%) | Heat interruption power | C* |
| --- | --- | --- | --- | --- | --- | --- |
| Example 1 | 180 | 8 | 86 | 79 | 2.0 | 1.7 |
| Example 2 | 290 | 8 | 86 | 80 | 1.8 | 3.6 |
| Example 3 | 520 | 2 | 87 | 81 | 2.0 | 3.4 |
| Example 4 | 180 | 7 | 86 | 76 | 2.8 | 1.8 |
| Comparative Example 1 | 180 | 9 | 82 | 85 | 0.3 | 15.7 |
| Glass | — | 70 | 90 | 87 | — | — |

EXAMPLE 5

An embodiment of the ornamentation of the present invention is described with reference to FIG. 1. An intermediate film 2 for preventing interference color having a hollowed portion 4 of a pattern desired for an ornament is formed on a surface of a substrate glass 1, and a ultraviolet ray absorbent film 3 is formed on the intermediate film 2.

The intermediate film 2 and the ultraviolet ray absorbent film 3 are formed by the method described in Example 1. The patterned hollow portion is formed by etching after the forming of the intermediate film 2.

EXAMPLE 6

A ultraviolet ray absorbent glass was prepared in the same manner as in Example 1 except that the ultraviolet ray absorbent film was baked in a strengthening furnace heated to 700° C., instead of baking it at 600° C.

The obtained ultraviolet ray absorbent glass was transparent and the optical characteristics of the glass were the same as those of the glass in Example 1.

EXAMPLE 7

All the solvent for the solution A, the coating solution B and the coating solution C used in Example 1 were changed to hexylene glycol (which are referred to as solution A', coating solution B' and coating solution C', respectively). The coating solution C' was coated on a substrate glass by flexographic printing, and the coated solution was dried by irradiating ultraviolet rays with use of a metal halide lamp to thereby form an intermediate film. The coating solution B' was coated on the intermediate film by flexographic printing, and coated solution B' was dried at 150° C. for 5 minutes, followed by baking it in a strengthening furnace.

The obtained ultraviolet ray absorbent glass was transparent, and the optical characteristics of the glass were the same as those of the glass obtained in Example 1.

EXAMPLE 8

According to the method of Example 7, solutions for the intermediate film and the ultraviolet ray absorbent film were coated on the glass. After they were dried, a black ceramic color paste and a conductive silver paste were applied with a pattern by screen-printing. The pastes were dried in a drying device of 100° C. for 2 minutes. The obtained product was baked and strengthened in a strengthening furnace.

The obtained ultraviolet ray absorbent glass was transparent, and the optical characteristics were the same as those of the glass obtained in Example 7. Further, there were found no run and no color change of the black ceramic color and the silver electrode. The performance of the obtained glass was the same as that of a conventional glass with printing.

EXAMPLE 9

On a substrate glass, a black ceramic color paste and a conductive silver paste were printed respectively with use of a screen-printing machine, followed by drying them in a drying device of 100° C. for 5 minutes. The coating of the solutions and the baking were conducted in the same manner as those in Example 7.

The obtained glass was transparent, and the optical characteristics were the same as those of the glass obtained in Example 7. Further, there were found no run and no color change of the black ceramic color and the silver electrode. The performance of the glass was the same as that of a conventional glass with printing.

COMPARATIVE EXAMPLE 2

The coating solution B' for a ultraviolet ray absorbent film used in Example 7 was directly formed on a substrate glass by printing, and film forming was made in the same manner as in Example 7.

The obtained film had a refractive index of 2.3 and a film thickness of 180 nm.

The film was transparent. However, the reflection light was green and the reflectance was high whereby the heat interruption power calculated was 0.79.

Thus, in accordance with the present invention, iridescence caused in an oxide film type ultraviolet ray absorbent glass, which was a problem in conventional technique, can be reduced: reflection light can be controlled to an extent near a neutral color, and a heat reflecting function can be imparted without reducing the visible light transmittance. Accordingly, the ultraviolet ray absorbent glass can be widely applied to fields of automobile and building.

Further, the ultraviolet ray absorbent glass of the present invention can be provided with flexibility in a transparent ornament or design without sacrificing a ultraviolet ray absorbing function.

Further, in accordance with the present invention, a ultraviolet ray absorbent glass for automobiles capable of reflecting near infrared rays without reducing the visible light transmittance and having a high heat interruption power can be obtained in a simple method with saving energy.

Obviously, numerous modifications and variations of the present invention are possible in light of the above teachings. It is therefore to be understood that within the scope of the appended claims, the invention may be practiced otherwise than as specifically described herein.

What is claimed is:

1. An ultraviolet ray absorbent glass which comprises:
   a substrate glass,
   an ultraviolet ray absorbent film having a thickness of 100–800 nm comprising at least two members selected from the group consisting of zinc oxide, titanium oxide and cerium oxide, and
   a transparent metal oxide intermediate film comprising at least two components selected from the group consisting of silicon oxide, germanium oxide, aluminum oxide, zirconium oxide, titanium oxide, tin oxide, indium oxide, tantalum oxide, zinc oxide and cerium oxide, provided that at least one component is selected from the group consisting of zing oxide, titanium oxide and cerium oxide, having refractive index which is between the refractive indices of the ultraviolet ray absorbent film and the substrate glass, the intermediate film having an optical film thickness of $\lambda/4\pm10\%$ as large as the wavelength of visible light of 400–700 nm, said intermediate film being located between the ultraviolet ray absorbent film and the substrate glass, whereby iridescence by the ultraviolet ray absorbent film is reduced, and a heat reflecting function is imparted.

2. The ultraviolet ray absorbent glass according to claim 1, wherein the intermediate film is an intermediate film which satisfies the equation of $n_m = (n_f \times n_g)^{1/2} \pm 10\%$ where $n_f$ is the refractive index of the ultraviolet ray absorbent film, $n_g$ is the refractive index of the substrate glass and $n_m$ is the refractive index of the intermediate film.

3. The ultraviolet absorbent glass according to claim 2, wherein $n_m = (n_f \times n_g)^{1/2}$.

4. The ultraviolet ray absorbent glass according to claim 1, wherein the ultraviolet ray absorbent film comprises cerium oxide, titanium oxide and silicon oxide.

5. The ultraviolet ray absorbent glass according to claim 1, wherein the intermediate film includes an electric conductive component.

6. The ultraviolet ray absorbent glass according to claim 1, wherein the intermediate film is partially omitted while the ultraviolet ray absorbent film is formed whereby an interference color is produced at the portion of the ultraviolet ray absorbent film where the intermediate film is partially omitted, thereby providing a transparent ornament or a design in the glass.

7. The ultraviolet ray absorbent glass according to claim 1, wherein the optical film thickness of the intermediate film is $\lambda/4$.

8. The ultraviolet ray absorbent glass according to claim 1, wherein said ultraviolet ray absorbent film has a refractive index in the range of about 1.9–2.1.

9. The ultraviolet ray absorbent glass according to claim 1, wherein said metal oxide intermediate film is a two metal oxide component film selected from the group consisting of $ZnO$—$SiO_2$, $ZnO$—$Al_2O_3$, $ZnO$—$GeO_2$, $ZnO$—$ZrO_2$, $TiO_2$—$SiO_2$, $TiO_2$—$Al_2O_3$, $TiO_2GeO_2$, $TiO_2$—$ZrO_2$, $CeO_2$—$SiO_2$, $CeO_2$—$Al_2O_3$, $CeO_2$—$GeO_2$ and $CeO_2$—$ZrO_2$.

* * * * *